United States Patent [19]
Gallenberg

[11] Patent Number: 5,967,540
[45] Date of Patent: Oct. 19, 1999

[54] SELF-PROPELLED AGRICULTURAL IMPLEMENT

[76] Inventor: Ronald J. Gallenberg, W9120 Cherry Rd., Antigo, Wis. 54409

[21] Appl. No.: 09/002,297

[22] Filed: Dec. 31, 1997

[51] Int. Cl.[6] .................................................. B60D 13/00
[52] U.S. Cl. ............................................ 280/481; 280/495
[58] Field of Search ................................... 280/495, 496, 280/43, 46, 33.991, 33.996, 481; 180/209, 418, 53.4, 53.7

[56] References Cited

U.S. PATENT DOCUMENTS

| | | |
|---|---|---|
| 2,524,083 | 10/1950 | Ronning . |
| 3,324,637 | 6/1967 | Ashton et al. . |
| 3,345,808 | 10/1967 | Van Der Lely . |
| 3,403,802 | 10/1968 | Lundell . |
| 3,425,194 | 2/1969 | Stott et al. . |
| 3,645,074 | 2/1972 | Rettig et al. . |
| 3,673,775 | 7/1972 | Jones . |
| 3,693,332 | 9/1972 | Bobard . |
| 3,720,047 | 3/1973 | van der Lely . |
| 3,975,889 | 8/1976 | Kerber et al. . |
| 4,078,626 | 3/1978 | Weichel ................................ 180/53 R |
| 4,150,525 | 4/1979 | De Busscher et al. . |
| 4,650,018 | 3/1987 | Silverman, Sr. ....................... 180/14.7 |
| 4,828,071 | 5/1989 | Gaede . |
| 4,905,462 | 3/1990 | Hurlburt . |
| 5,029,436 | 7/1991 | Fredriksen et al. . |
| 5,247,787 | 9/1993 | Snell . |

Primary Examiner—Lanna Mai
Assistant Examiner—Faye M. Fleming

[57] ABSTRACT

A self-propelled agricultural implement having a power unit with a pair of steerable drive wheels and a pair of rearward balance wheels. The forward end of the power unit is selectively connectable to an implement attachment having forward attachment wheels and power connections from the power unit.

20 Claims, 6 Drawing Sheets

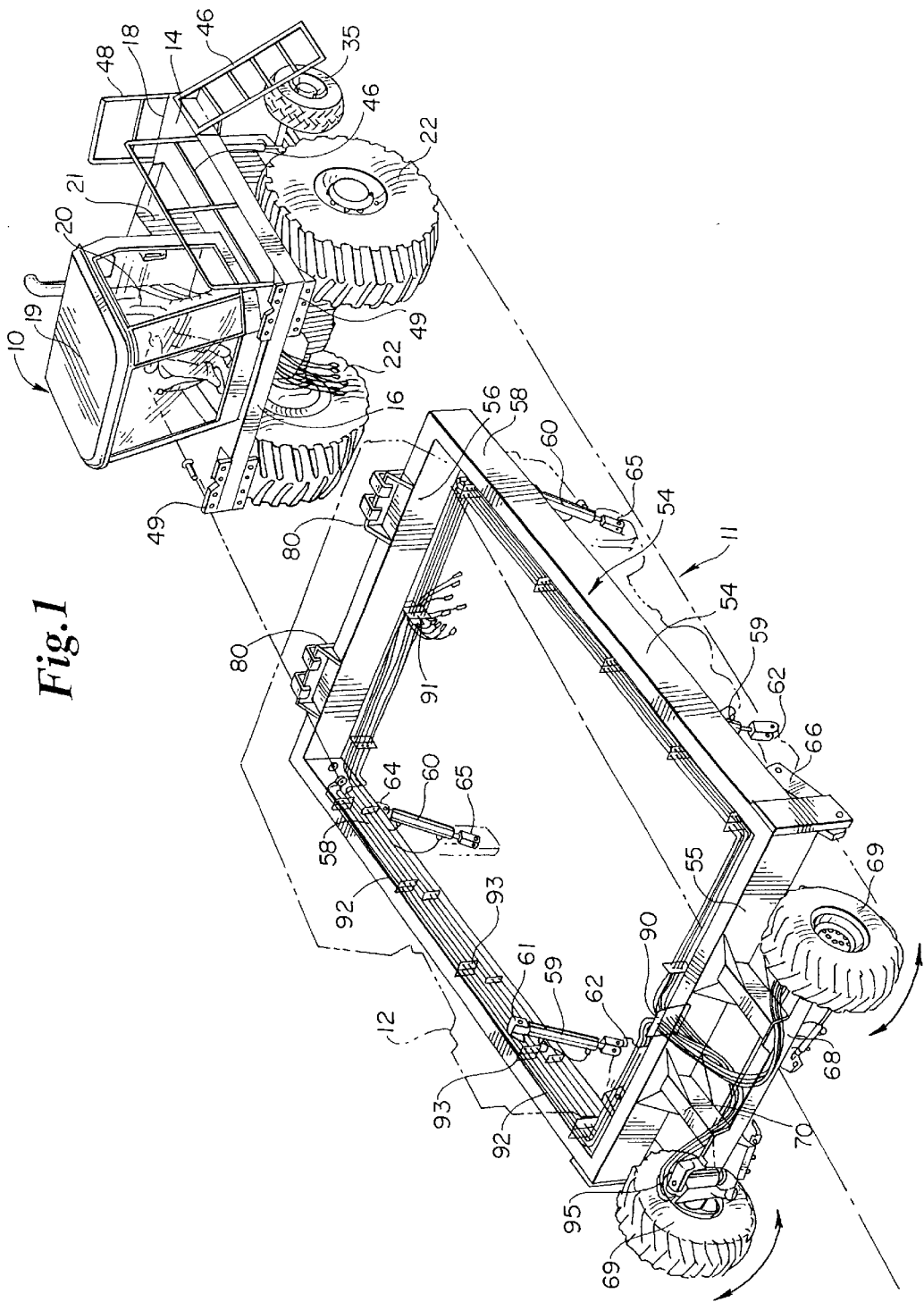

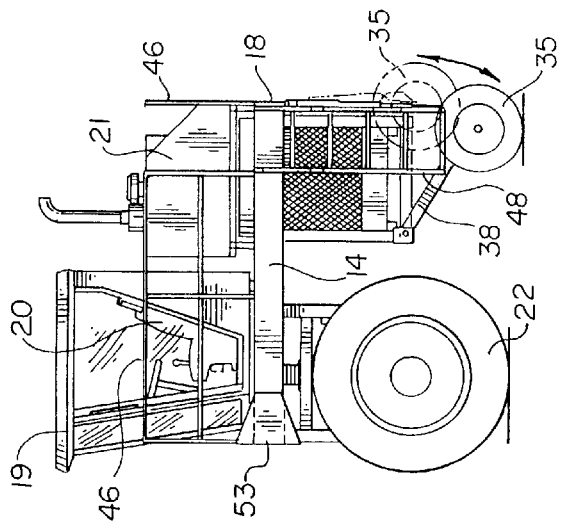
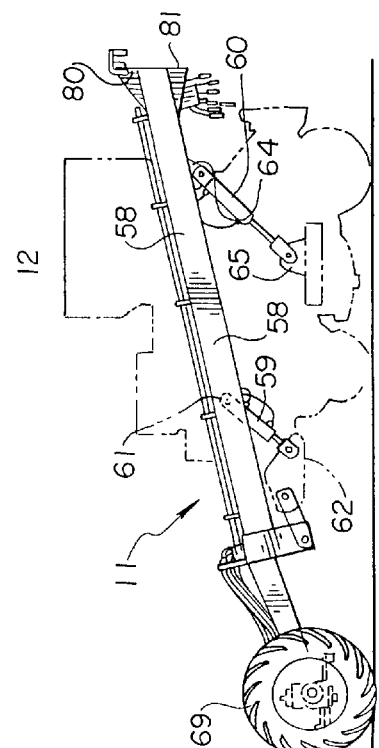
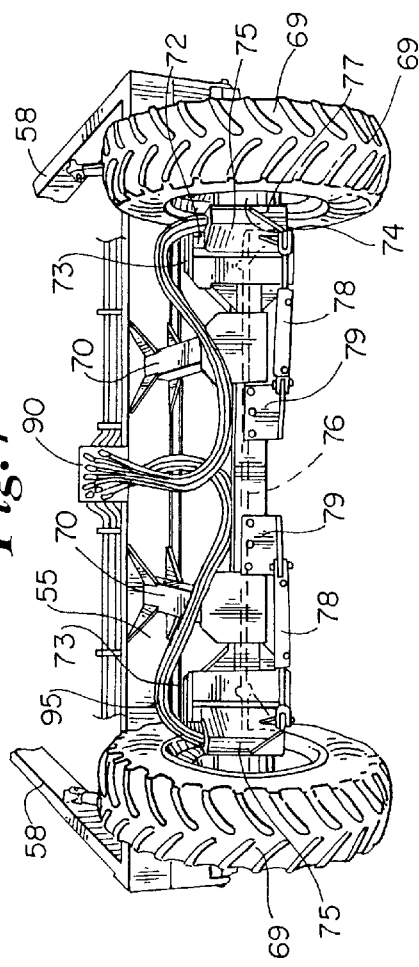
Fig.3
Fig.2
Fig.4

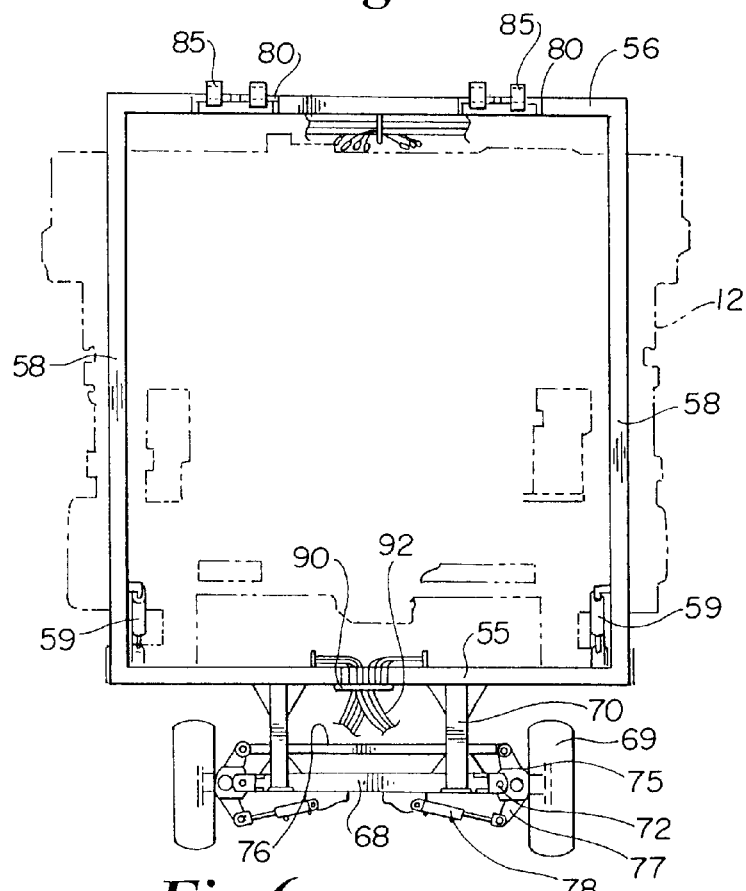
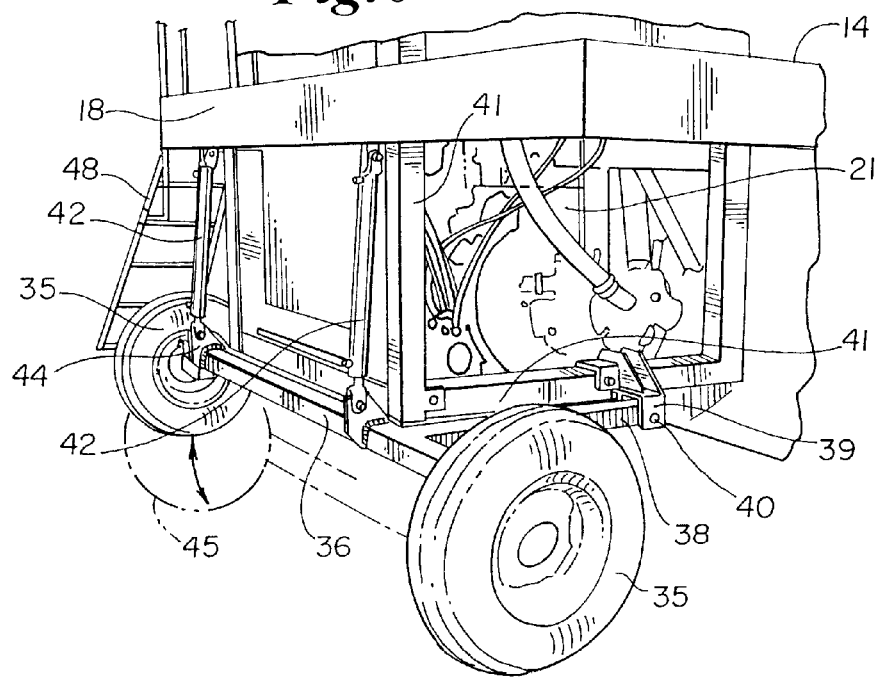

SELF-PROPELLED AGRICULTURAL IMPLEMENT

BACKGROUND OF THE INVENTION

1. Field of the Invention

The present invention relates to a self-propelled agricultural implement and more specifically to a self-propelled agricultural implement having a power unit and one or more implement attachments selectively attachable to and detachable from the forward end of the power unit.

2. Description of the Prior Art

A variety of implements currently exist which have been used to perform various agricultural tasks relating to the planting, maintaining and harvesting of agricultural crops. In the case of potatoes, these may include tasks such as planting, windowing, hilling, and harvesting. In the past, these tasks were accomplished by a conventional tractor with a separate implement, dedicated to performing a particular task, attached to and towed behind the tractor. When that task was completed, the implement relating to such task would be disconnected and a new implement attached. Although this worked reasonably well, it was necessary for the operator in such a system to continually turn to look over his or her shoulder at the towed implement to make sure the implement was functioning properly. This constant turning, particularly for extended hours of operation, led to numerous neck, back and other medical problems. These in turn resulted in increased insurance or injury claims and thus an overall increase in operator cost.

More recently, self-propelled implements with power units and dedicated implements have been designed which carry implement members for performing a specific task. These implement members are generally positioned forward of the operator, thus eliminating the need to continually turn and check the operation of the implement. A primary disadvantage of such a system, however, is the fact that such implement is dedicated to performing only one specific task. Thus, in the case of potatoes, several of such implements, each with a separate power unit and dedicated implement member, are needed to perform all of the tasks relating to the planting, maintenance and harvesting of the crop. This results in significant down time for many of the self-propelled units and a significant increase in expense.

Accordingly, there is a need in the art for an implement which overcomes the limitations which currently exist.

SUMMARY OF THE INVENTION

In general, the present invention relates to a self-propelled agricultural implement in the form of a self-contained power unit in combination with one or more selectively connectable implement attachments which are selectively connectable to the forward end of the power unit. Such a system is distinguished from a conventional tractor in which a plurality of trailing implement attachments are selectively connectable with the rearward tractor hitch for towing. In the present invention, a self-propelled power unit is provided in combination with one or more implement attachments connectable at its forward end so that the attachments are pushed rather than pulled by the power unit. The power unit includes an operator seat which faces toward its forward end and thereby permits the operator to fully align and view the operation of the implement attachment while sitting and facing in the forward direction. This essentially eliminates any need for the operator to continually turn to view operation of the attachment as in the case with a conventional tractor and trailing attachments.

The implement of the present invention includes means for selectively connecting the implement attachment to, and disconnecting the implement attachment from, the forward end of the power unit. Thus, with the implement of the present invention, the same power unit can be used with a plurality of implement attachments. This maximizes the utilization of the power unit and significantly reduces costs associated the planting, maintaining and harvesting of the crop.

More specifically, the power unit includes a pair of steerable drive wheels with a forwardly facing operator seat and one or more balance wheels positioned rearwardly of the drive wheels. These balance wheels function primarily to maintain the power unit in an upright position when not connected to an implement attachment and accordingly are designed to be moveable between an operative position in which the balance wheels engage the ground and a nonoperative position in which these wheels are lifted free of the ground.

The plurality of implement attachments are selectively connectable to, and disconnectable from, the forward end of the power unit and include one or more attachment wheels mounted at their forward ends. Preferably, these attachment wheels are both steerable and are power driven. The power for driving the wheels and for assisting the steering of such wheels is provided via a source of hydraulic fluid pressure from the power unit. The rearward end of each of the implement attachments and the forward end of the power unit include corresponding mounting plates for selective connection of the attachment to the power unit. In the preferred embodiment, these mounting plates are provided with mating beveled surfaces to provide for quick alignment capability.

Accordingly, it is an object of the present invention to provide an improved agricultural implement which eliminates many of the problems and limitations currently existing with conventional agricultural implements.

Another object of the present invention is to provide an improved self-propelled agricultural implement with one or more implement attachments selectively connectable to the forward end of a power unit.

A further object of the present invention is to provide a self-propelled implement in combination with one or more implement attachments provided with steerable and driven wheels and being separately and selectively connectable to the forward end of the power unit.

A still further object of the present invention is to provide a self-propelled agricultural implement with one or more forward attachments and a pair of rearward balance wheels moveable between an operative position and a nonoperative position.

These and other objects of the present invention will become apparent with reference to the drawings, the description of the preferred embodiment and the appended claims.

DESCRIPTION OF THE DRAWINGS

FIG. 1 is an isometric view showing the implement assembly of the present invention with the power unit in position to be connected with the implement attachment.

FIG. 2 is a side elevational view of one of the implement attachments with the implement shown in phantom.

FIG. 3 is a side elevational view of the power unit showing the balance wheels moveable between support and non-support positions.

FIG. 4 is a front isometric, fragmentary view of the attachment wheels and a portion of the attachment frame.

FIG. 5 is a top elevational view of an implement attachment in accordance with the present invention with the implement shown in phantom.

FIG. 6 is an isometric, fragmentary view of a rearward portion of the power unit showing the balance wheels moveable between support and non-support positions.

DESCRIPTION OF THE PREFERRED EMBODIMENT

Figure 7:
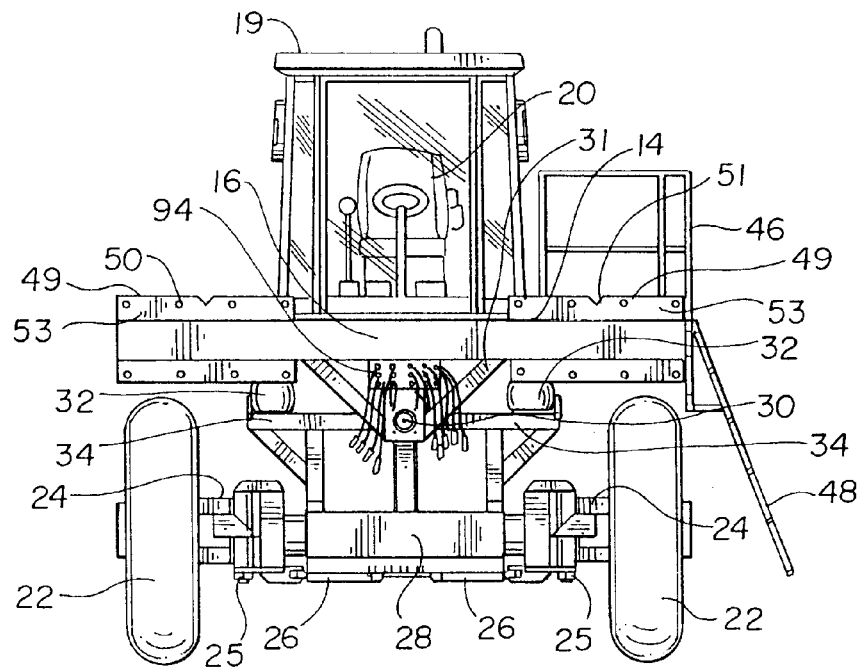
FIG. 7 is a front elevational view of the power unit with the implement attachment disconnected.

With general reference to FIG. 1, the implement of the present invention includes a power unit illustrated by the general reference character 10 and a selectively connectable implement attachment 11 for selective connection to, and disconnection from, the forward end of the power unit 10. In accordance with the preferred embodiment of the present invention, it is intended that the power unit 10 would be used with a plurality of separate connectable implement attachments 11. Each of these attachments would be selectively connectable to the power unit 10 and would include a different implement member shown in phantom in FIG. 1 by the reference character 12. For purposes of describing the present invention, only one such implement attachment 11 will be illustrated. For purposes of example only, the implement member 12 may be any form of implement useful in planting, maintaining or harvesting of a crop such as, in the case of potatoes, a planter, a windrower, a hiller, a harvester or the like.

With continuing general reference to FIG. 1 and more specific reference to FIGS. 3, 6 and 7, the power unit is shown to include a power unit platform 14 having a forward end 16 and a rearward end 18. Mounted to the platform 14 is a cab 19, an operator seat 20 facing the forward end 16 of the unit 10, a plurality of guard rails 46 and a mounting ladder 48. A conventional engine 21 is positioned rearwardly of the cab 19 for driving the pair of drive wheels 22,22 and generating hydraulic fluid pressure for operation of other components of the system.

In the preferred embodiment, the wheels 22,22 are both driven and steerable. As illustrated best in FIG. 7, the wheels 22,22 are mounted on axle stubs 24,24 which are in turn pivotally connected to the lower vehicle frame portion 28. Steering power is provided to the wheels 22,22 via the steering cylinders 26,26. The lower frame portion 28 is pivotally connected to an upper vehicle frame portion 29 at the pivot 30. The upper frame portion 29 is in turn connected with the platform 14 by a plurality of frame struts 31. A plurality of air cushion stabilizing members 32 are positioned between outwardly extending portions 34 of the lower frame 28 and portions of the upper frame 29 to assist in suspending and stabilizing the platform 14 of the power unit 10 during operation.

As shown in FIGS. 1, 3 and 6, a pair of balance wheels 35,35 are mounted to the power unit rearwardly of the drive wheels 22 and near the rearward end 18 of the power unit 10. The balance wheels 35 are rotatably mounted at the ends of an axle member 36. A pair of connecting braces 38 are integrally connected with the axle member 36 and extend forwardly from the axle where they are pivotally connected with the pivot bracket 39 at the pivot point 40. The pivot bracket 39 is rigidly secured to a portion of the vehicle frame 41.

A pair of power cylinders 42,42 are connected between a portion of the frame 41 and the cylinder brackets 44,44 on the axle 36. These cylinders 42,42 function to selectively move the balance wheels 35 between an operative position 45 illustrated in phantom in FIG. 6 in which the wheels engage the ground and a nonoperative position shown by the solid lines in FIG. 6 in which the wheels 35 are raised off the ground. In the preferred embodiment, the balance wheels 35, 35 function solely to support the power unit when it is disconnected from an implement attachment. Thus, the wheels 35,35 are not powered and are not steerable. The cylinders 42,42 are powered by hydraulic fluid from the main power unit 10.

Figure 9:
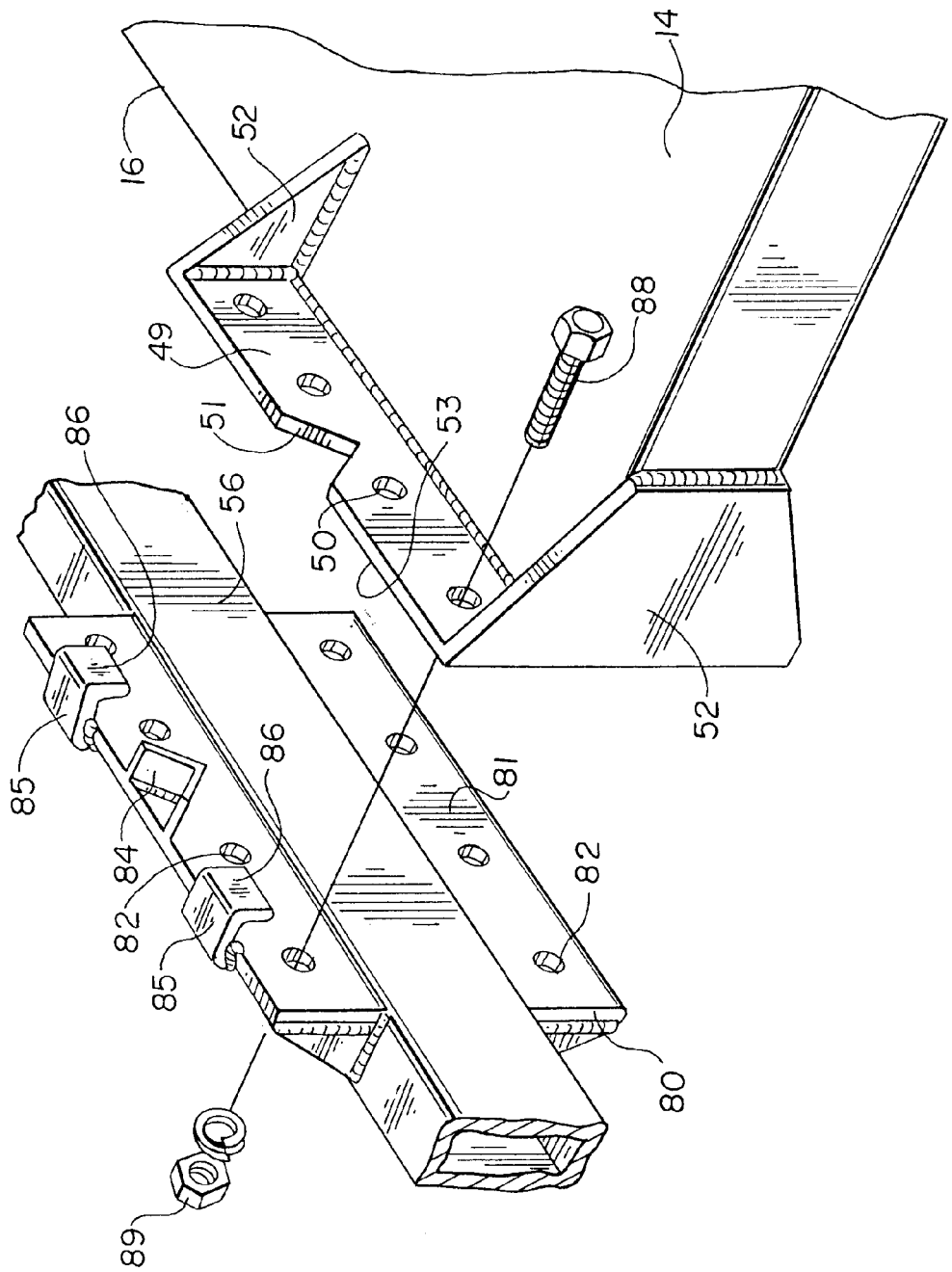
FIG. 9 is an isometric view showing the means in accordance with the present invention for aligning and connecting the implement attachment with the power unit.

Provided at the forward end of the power unit 10, and specifically at the forward end 16 of the platform 14, are a pair of spaced power unit mounting plates 49,49. Each of the plates 49 has a substantially planar surface 53 lying in a vertical plane and a plurality of mounting holes 50. The top edge of each of the mounting plates 49 is provided with a beveled surface in the form of the V-shaped notch 51. As will be described in greater detail below, the V-shaped notch 51 functions to receive a correspondingly shaped beveled member associated with the implement attachment for aligning and connecting the implement attachment 11 to the power unit 10. As shown best in FIG. 9, the mounting plate 49 is rigidly secured to the platform 14 by welding and a plurality of gussets 52. As shown best in FIGS. 1 and 7, the vertical planar surface 53 of each plate 49 is comprised of a portion of the front platform end 16 and plate portions on opposite sides of the platform end 16.

With reference to FIGS. 1, 2 and 5, the implement attachment 11 includes a generally rectangular frame member 54 having a forward frame end 55, a rearward frame end 56 and a pair of frame sides 58, 58. The frame ends 55 and 56 and the frame sides 58, 58 are joined together rigidly to form the attachment frame 54. The implement member 12 is mounted to the frame 54 for operative adjustment relative to the frame 54 by a plurality of forward power cylinders 59, 59 and rearward power cylinders 60, 60. Each of the cylinders 59 includes a first end 61 connected with one of the frame sides 58 and a second end 62 connected with a portion of the implement member 12. Each of the rearward cylinders 60 includes a first end 64 connected with one of the frame sides 58 and a second end 65 connected with a portion of the implement member 12. The cylinders 59 and 60 are powered by hydraulic fluid pressure provided from the power unit 10 via various hydraulic hoses and hydraulic power attachments. A portion of the implement may be pivotally secured to the frame 54 by a plurality of pivot brackets 66. By appropriate actuation of the cylinders 59 and 60, the implement member 12 may be raised and lowered relative to the frame 54 between an operative and a nonoperative position.

An attachment wheel frame is connected with the forward frame end 55 to support a pair of spaced attachment wheels 69,69. The attachment wheel frame includes a laterally extending main frame member 68 and a pair of supporting frame members 70,70 extending between the frame member 68 and the frame end 55. Positioned at each end of the frame member 68 is a wheel support bracket 71 having a pair of spaced ears 73,73 for pivotally mounting the attachment wheel 69 relative to the vertically extending pivot 72. Each of the attachment wheels 69 is mounted on an axle stub 74 and is driven by a hydraulic motor 75.

Figure 8:
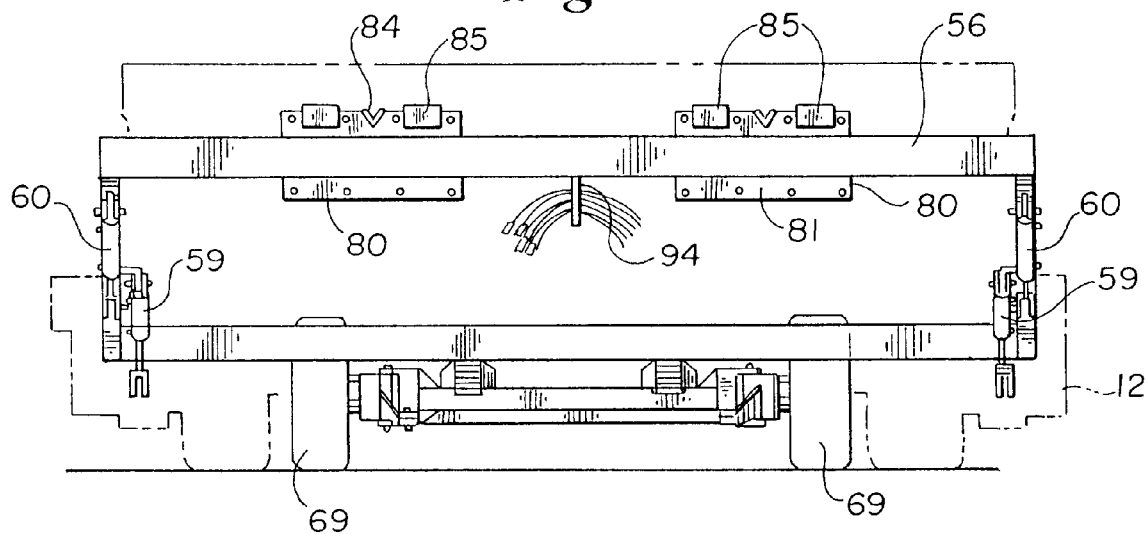
FIG. 8 is a rear elevational view of the implement attachment disconnected from the power unit.

In the preferred embodiment, the attachment wheels 69,69 are also steerable. The steering mechanism includes a tie-rod 76 and a pair of steering cylinders 78,78. Each of the cylinders 78 has one end connected to a cylinder bracket 79 on the frame member 68 and a second end connected to a bracket portion 77 of the attachment wheel assembly. Hydraulic power for the steering cylinders 78,78, the power cylinder 59 and 60 and the hydraulic motors 75,75 is provided from the main power unit 10 via appropriate hydraulic hoses, conduits and connections. These include the hydraulic hose connection plate 90 mounted at the forward end 55 of the attachment frame, the connection plate 91 mounted at the rearward end 56 of the attachment frame, a plurality of hydraulic conduits or hoses 92 and a plurality of conduit supports 93. The power unit 10 includes a hydraulic power connection manifold 94 (FIG. 8) or similar means for appropriate connection via hoses or the like with the connection plate 91. A plurality of hydraulic hoses 95 extend from the plate 90 to distribute hydraulic power from the plate to the steering cylinders 78 and the drive motors 75. Similarly, a plurality of hydraulic hoses or conduits extend between the connection place 91 and the manifold 94 to provide hydraulic fluid pressure from the power unit 10. These are selectively connected and disconnected with the connection and disconnection of the attachment 11. Preferably, each of the hydraulic hoses, conduits and connections are provided with quick connect/disconnect couplers which are known in the art.

The rearward end of the implement attachment 11 is provided with a pair of mounting members in the form of the spaced attachment mounting plates 80,80. As illustrated best in FIGS. 1, 2, 8 and 9, the mounting plates 80,80 each have a generally vertical planar surface 81. The surfaces 81 correspond generally to the planar surfaces 53 of the power unit mounting plates 49 are comprised of a portion of the rearward surface of the frame end 56 and plate portions on opposite sides thereof. The attachment mounting plates 80 further include a plurality of mounting holes 82 which are generally aligned with the mounting holes 50 of the power unit mounting plates 49. Rigidly secured near the top of the plates 80 and extending rearwardly from the surface 81 is a beveled surface in the form of the V-shaped member 84. When the implement attachment 11 and the power unit 10 are desired to be connected, the member 84 seats within the V-shaped notch 51 to assist in aligning the mounting plates 80 and 49 and their corresponding alignment holes 82 and 50.

The top edges of the mounting plates 80 are also provided with a pair of alignment members 85,85 having rearwardly extending overhang portions 86,86 to hook over the top edge of the corresponding power unit mounting plates 49 to assist in aligning the plates and maintaining them in position for connection. A plurality of threaded mounting bolts 88 and lugs 89 extend through the corresponding mounting holes 50 and 82 for securing the mounting plates 49 and 80 to one another.

Accordingly, it can be seen that the vehicle of the present invention includes a power unit having a forward end and rearward end, a pair steerable drive wheels connected with the power unit, an operator seat facing the forward end and one or more implement attachments selectively connectable to the forward end of the power unit. The power unit also includes one or more balance wheels mounted rearwardly of the drive wheels and being moveable between an operative position in which the balance wheels engage the ground and a nonoperative position in which the wheels are raised above the ground or removed. Each implement attachment includes a forward end and a rearward end in which the rearward end is selectively connectable to and disconnectable from the forward end of the power unit. The implement attachment includes a frame, a suspended implement member and one or more attachment wheels mounted at or near the forward end of the attachment frame. Preferably these attachment wheels are both steerable and driven, with the hydraulic power for such operation being provided by the power unit. If desired, the attachment wheels and their corresponding hydraulic power hoses and connections can be disconnected from one attachment member and connected to another to eliminate the need for multiple sets of attachments wheels. This can be done either by removing the wheels 69,69 from their corresponding axle stubs or by removing the entire wheel assembly 98 as shown in FIG. 10.

Figure 10:
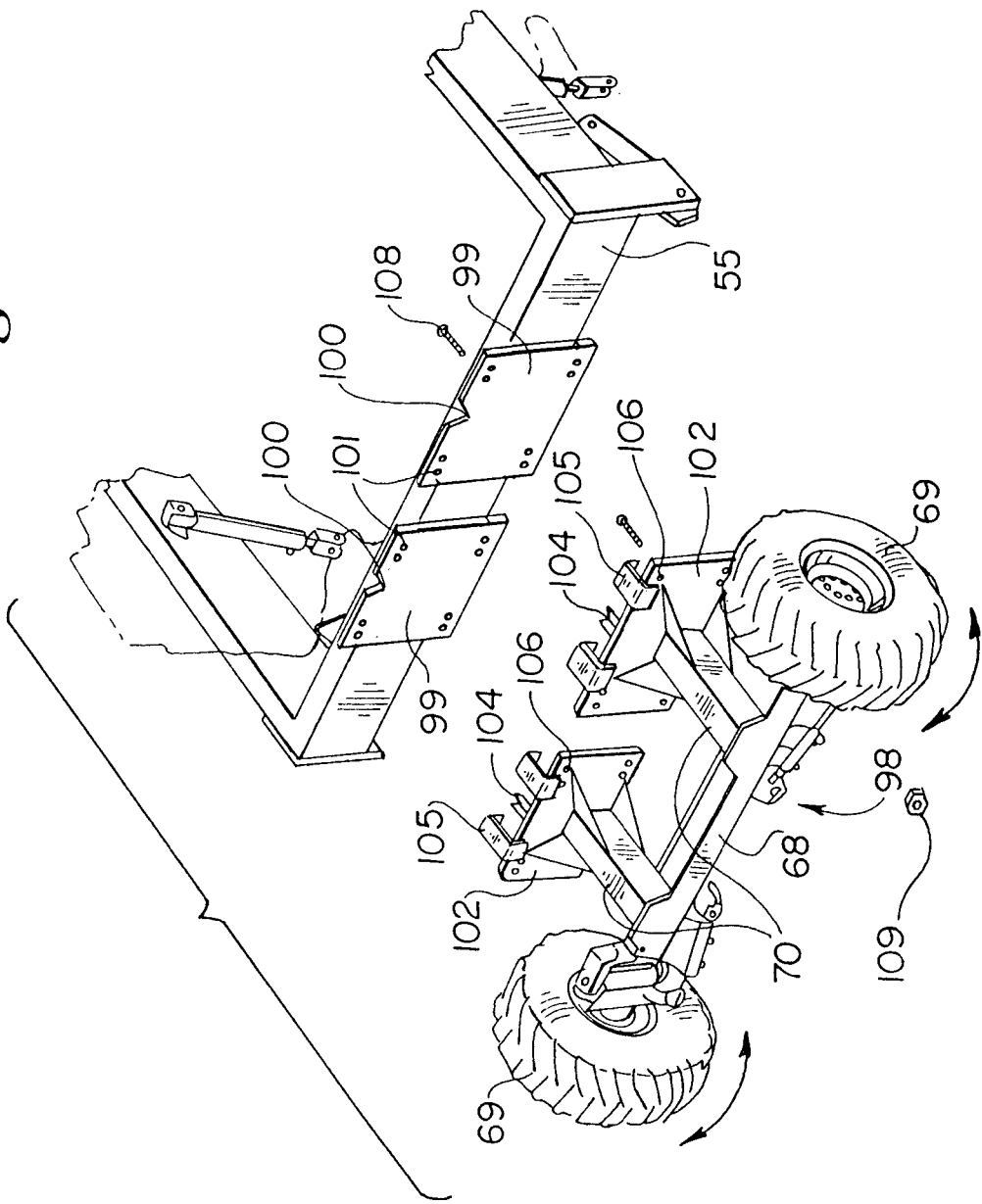
FIG. 10 is an isometric fragmentary view of a further embodiment showing a portion of the implement attachment and a selectively connectable attachment wheel assembly.

In FIG. 10, the attachment wheel assembly 98 which includes the wheels 69,69, the frame members 68, 70,70 and related structure is designed for selective connection to the forward end of the implement attachment 11. To facilitate this connection, the forward end 55 of the attachment 11 is provided with a pair of connecting plates 99,99 similar to the power unit connecting plates 49,49. These plates 99,99 includes V-notches 100 and a plurality of connecting holes 101. The rearward sides of the frame members 70,70 of the wheel assembly 98 includes corresponding wheel assembly connecting plates 102,102 similar to the implement connecting plate 80,80. The connecting plate 102,102 are provided with corresponding V-shaped members 104, overhanging alignment members 105 and a plurality of connecting holes 106. When assembled, the plates 99 and 102 are positioned in face-to-face relationship with the V-members 104 and V-notch 100 engaged. Threaded bolts 108 are then inserted through the aligned holes 101 and 106 and secured by lugs 109.

With the embodiment of FIG. 10, the forward attachment wheel assembly can be selectively connected to and disconnected from different implement attachments.

Having described the structure of the preferred embodiment, the use of the vehicle in accordance with the present invention can be understood best as follows:

First, when in its nonoperative position, the power unit 10 is free standing and disconnected from any implement attachment. In this position, it is supported forwardly by its drive wheels 22,22, and rearwardly by its rearward balance wheels 35,35. In this position, the balance wheels are in an operative ground engaging position as illustrated by the solid lines in FIG. 3. When the power unit 10 is to be connected with one of a plurality of implement attachments 11, the power unit 10 is driven to the desired implement attachment so that the respective mounting plates 49,49 of the power unit 10 and the mounting plates 80,80 of the attachment 11 are approximately aligned with one another. Through various hydraulic actuations of the cylinders 59 or 60 of the implement attachment 11 or the balance wheel cylinders 42, the relative position of the mounting plates 49 and 80 can be adjusted so that the overhanging alignment members 85 of the mounting plate 80 can be positioned over the top edge of the mounting plate 49. This causes engagement between the V-shaped member 84 and the V-notch 51 to properly align the mounting plates 49 and 80 and their respective mounting holes. The threaded members 88 are then inserted through the mounting holes and a washer and lug 89 threaded onto the member 88 to rigidly and securely connect the mounting plates 49 and 80, and thus the power unit 10 and the implement attachment 11, to one another.

The hydraulic power hoses and connections 92 and 95 are then connected between the implement attachment 11 and the power unit 10 so that all of the cylinders 59 and 60 and the drive and steering assemblies for the attachment wheels can be operated via the vehicle operator.

If it is desired to replace one implement attachment with another, the connected implement attachment is disconnected by reversing the above procedure. The power unit, with extended balance wheels is then moved to the next attachment for connection. If desired, the balance wheels 35,35 can be removed when not in use. The attachment wheels 69,69 and associated hydraulic hoses may if desired, be removed from one attachment and used with another.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

I claim:

1. A self-propelled implement comprising:
    a power unit having a forward end and a rearward end;
    a pair of first laterally spaced mounting members connected with the forward end of said power unit;
    a pair of steerable drive wheels connected with said power unit;
    an operator seat facing toward said forward end;
    one or more balance wheels mounted to said power unit rearwardly of said drive wheels;
    an implement attachment having a forward end and a rearward ends;
    a pair of second laterally spaced mounting members connected with the rearward end of said implement attachment, said pair of second mounting members being rigidly connectable to said pair of first mounting members wherein the rearward end of said implement attachment is selectively and rigidly connectable to the forward end of said power unit; and
    one or more attachment wheels mounted to said implement attachment.

2. A self-propelled implement comprising:
    a power unit having a forward end and a rearward end;
    a pair of steerable drive wheels connected with said power unit;
    an operator seat facing toward said forward end;
    one or more balance wheels mounted to said power unit rearwardly of said drive wheels wherein said one or more balance wheels are moveable between a ground engaged operative position and a ground disengaged inoperative position;
    an implement attachment having a forward end and a rearward end wherein the rearward end of said implement attachment is selectively connectable to the forward end of said power unit; and
    one or more attachment wheels mounted to said implement attachment.

3. The implement of claim 2 wherein said one or more balance wheels includes a pair of spaced balance wheels.

4. The implement of claim 1 wherein said one or more attachment wheels are steerable.

5. The implement of claim 4 wherein said one or more attachment wheels are powered.

6. The implement of claim 1 wherein said one or more attachment wheels are powered.

7. A self-propelled implement comprising:
    a power unit having a forward end and a rearward end;
    a pair of steerable drive wheels connected with said power unit;
    an operator seat facing toward said forward end;
    one or more balance wheels mounted to said power unit rearwardly of said drive wheels;
    an implement attachment having a forward end and a rearward end wherein the rearward end of said implement attachment is selectively connectable to the forward end of said power unit;
    one or more attachment wheels mounted to said implement attachment wherein said one or more attachment wheels are powered; and
    a hydraulic power unit mounted at the forward end of said attachment and operatively connected with at least one of said attachment wheels.

8. The implement of claim 5 wherein said one or more balance wheels are moveable between a ground engaged operative position and a ground disengaged inoperative position.

9. The implement of claim 8 wherein said one or more balance wheels includes a pair of spaced balance wheels.

10. The implement of claim 1 wherein said first mounting members include a power unit mounting surface and said second mounting members include an attachment mounting surface, said power unit mounting surface and said attachment mounting surface being selectively connectable to one another.

11. A self-propelled implement comprising:
    a power unit having a forward end and a rearward end;
    a pair of steerable drive wheels connected with said power unit;
    an operator seat facing toward said forward end;
    one or more balance wheels mounted to said power unit rearwardly of said drive wheels;
    an implement attachment having a forward end and a rearward end wherein the rearward end of said implement attachment is selectively connectable to the forward end of said power unit;
    a power unit mounting surface at the forward end of said power unit and an attachment mounting surface at the rearward end of said attachment, said power unit mounting surface and said attachment mounting surface being selectively connectable to one another and said power unit mounting surface and said attachment mounting surface including a plurality of aligned mounting holes and corresponding connecting members extending through said mounting holes; and
    one or more attachment wheels mounted to said implement attachment.

12. The implement of claim 10 wherein said power unit mounting surface and said attachment mounting surface include mating beveled surfaces to position said attachment relative to said power unit for said selective connection.

13. The implement of claim 1 wherein said attachment wheels are mounted at the forward end of said implement attachment.

14. The combination of an implement and an implement attachment comprising:
    a power unit having a forward end, a rearward end and an operator seat facing toward said forward end;

a balance wheel connected near the rearward end of said power unit and being moveable between a ground engaged operative position and a ground disengaged position;

an implement attachment having a forward end and a rearward end, with the rearward end of said implement attachment being selectively connectable to the forward end of said power unit; and a pair of attachment wheels connected near the forward end of said attachment.

15. The combination of claim 14 wherein said one or more attachment wheels are steerable.

16. The combination of claim 15 wherein said one or more attachment wheels are powered.

17. The combination of claim 16 including a power unit mounting surface at the forward end of said power unit and an attachment mounting surface at the rearward end of said attachment, said power unit mounting surface and said attachment mounting surface being selectively connectable to one another.

18. A self-propelled implement comprising:

a power unit having a forward end and a rearward end;

a pair of steerable drive wheels connected with said power unit;

an operator seat facing toward said forward end;

an implement attachment having a forward end and a rearward end wherein said rearward end of said implement attachment is selectively connectable to the forward end of said power unit; and an attachment wheel assembly having one or more attachment wheels, said attachment wheel assembly being selectively connectable to the forward end of said implement attachment.

19. The implement of claim 18 wherein said one or more attachment wheels are steerable.

20. The implement of claim 19 wherein said one or more attachment wheels are driven.

* * * * *